United States Patent [19]

Mathieu

[11] 4,248,637
[45] Feb. 3, 1981

[54] MICROPOROUS MATERIAL ESPECIALLY FOR USE IN THE CERAMIC INDUSTRY

[75] Inventor: Alain Mathieu, Montelimar, France

[73] Assignee: Lafarge, S.A., Paris, France

[21] Appl. No.: 58,929

[22] Filed: Jul. 19, 1979

[30] Foreign Application Priority Data

Jul. 19, 1978 [FR] France .............................. 78 21461

[51] Int. Cl.$^3$ ............................................ C04B 21/00
[52] U.S. Cl. ................................ 106/40 R; 106/38.9; 106/109; 106/110
[58] Field of Search ..................... 106/40 R, 38.9, 109, 106/110

[56] References Cited

U.S. PATENT DOCUMENTS 3,309,210  3/1967  Norton et al. ..................... 106/40 R
3,824,112  7/1974  Lawrence et al. ................ 106/40 R

FOREIGN PATENT DOCUMENTS 1004608  9/1965  United Kingdom ................. 106/40 R

*Primary Examiner*—James Poer
*Attorney, Agent, or Firm*—Ernest F. Marmorek

[57] ABSTRACT

This material is an anorthite with an alumina skeleton of which the overall porosity is between 40 and 70% with a pore size such that the average diameter is between $0.75\mu$ and $8\mu$.

To obtain it, water is mixed with a mixture of aluminous and sillicoaluminous materials with at least 10% by weight of calcium sulphate, it is dried and calcined at 1000° to 1400° C. The starting materials are selected so that the final product essentially comprises CaO, $SiO_2$ and $Al_2O_3$ with, by an $SiO_2/Al_2O_3$ weight ratio less than 2 and a $CaO/Al_2O_3$ weight ratio less than 1. A preferred composition corresponds to point D of the diagram.

Application to replace plaster in the manufacture of moulds for the sanitary industry.

10 Claims, 4 Drawing Figures

MICROPOROUS MATERIAL ESPECIALLY FOR USE IN THE CERAMIC INDUSTRY

BACKGROUND OF THE INVENTION

The present invention relates to a microporous material usable particularly in the ceramic industry, and of which the pore size is close to that of gypsum plaster.

One of the applications of the invention of this material is the manufacture of moulds for the sanitary industry. The ceramic articles of the sanitary industry are obtained by pouring a clayey barbotine into a plaster mould. The porous nature of the plaster permits the percolation of the water of the barbotine, casting slip or slurry, and the hardening or setting of the moulded material, which takes the name "green body" and is solid and can be removed from the mould, then despatched to installations for drying, firing, and glazing.

It is required of the mould to have:
  (a) a good surface condition, indispensable because it conditions the exterior aspect of the finished product and the obtainment of a homogeneous glaze;
  (b) sufficient mechanical strength to permit handling without too much risk of deterioration, it is acknowledged that a tensile strength of 50 bars is sufficient;
  (c) a porosity and a pore size adapted to permit, for example, the obtainment of a "green body" 10 mm in thickness after a water percolation time of 1–2 hours.

In practice a very fine plaster is used, mixed with water under vacuum. These moulds nevertheless have the inconvenience of a limited working life, owing to, for the one hand, mechanical deterioration by erosion of the joints of the mould, formation of leaks, or by breakage or chipping, and on the other hand, to a progressive blocking up of the pores in the material by salts from the barbotine and/or the plaster itself. The regeneration of a plaster mould by washing and drying is practically impossible due to the instability of plaster which is susceptible to dissolution in water and dehydration. One of the objects of the present invention is to provide a material which permits moulds to be obtained which have mechanical properties and permeability at least equal to those of the present moulds, but which are capable of being dried at higher temperatures, thus more quickly, and which can be regenerated by washing when they have been choked by the deposition of salts. Moreover, plaster is used for purposes other than in the ceramic industry, thanks to its porous nature which gives rise to valuable thermal insulation properties and also permeability to liquids and to gases, and thanks to the facility with which it permits satisfactory surface states to be obtained, but these uses are often limited by the defects mentioned above.

Another object of the invention is to provide a material which can be used in a manner analogous to plaster, for example in the form of coatings obtained by rendering, without having the same limitations, or which can be used as a filter or catalyst support.

THE INVENTION

The porous material according to the invention is essentially constituted by CaO, $Al_2O_3$ and $SiO_2$. The compounds obtained by burning or firing are anorthite and alumina, with a $SiO_2/Al_2O_3$ ratio, by weight, less than 2 and $CaO/Al_2O_3$ ratio, by weight, less than 1, and its porosity is between 40 and 70% by volume, the pore diameter being essentially between 0.6 and 8 microns. Preferably, the weight ratio $SiO_2/Al_2O_3$ is between 0.15 and 1.5, and the weight ratio $CaO/Al_2O_3$ is between 0.07 and 0.6.

In one process for manufacturing material according to the invention, there is mixed with water a mixture of anhydrous calcium sulphate or of plaster finely crushed, of an aluminous fine material constituted by alumina trihydrate, calcined alumina, or white bauxite, ground to a fineness such that 95% by weight has a particle size less than 100 microns, and of fireclay crushed to a fineness so that 95% by weight is less than 100 microns, in such proportions that the $SiO_2/Al_2O_3$ ratio is less than 2, the $CaO/Al_2O_3$ ratio is less than 1 and the $CaSO_4$, measured as anhydrous, constitutes at least 10% of the dry weight of the mixture preparing a casting slip thereof with water, molding the slip to shape, and, after drying, firing at a temperature between about 1000° and below about 1400° C.

The fireclay is a clay calcined at a high temperature of which the composition is approximately the following: $SiO_2$: 50 to 55%, $Al_2O_3$: 40 to 45%; various oxides, ($TiO_2$, $Fe_2O_3$, $K_2O$, $Na_2O$, etc.) less than 10%.

The aluminous material can be natural or synthetic alumina trihydrate, low iron content bauxite calcined and crushed, or alumina obtained by moderate or intense calcination of aluminium trihydrate from the "Bayer" process. The gypsum plaster is a finely crushed plaster of the quality of casting plaster. There can be mentioned by way of example the plaster "Molda 3" from the Lambert Company.

The new material of the instant invention may be defined as a combination of particular properties. It may likewise be defined as a combination of a spectrum of pores akin to that of plaster and of a physical, chemical and crystallographic structure of anorthite with an alumina skeleton which gives it chemical and mechanical properties more favorable than that of gypsum plaster.

The process for obtaining the material according to the invention may also be explained by the combination of a choice of raw materials defined by their chemical composition and their grading and by a succession of physical and thermal treatments, this combination leading to the desired result. One important point of this process is the use of calcium sulfate which permits the molding and the achievement of the required porosity.

The English Pat. No. 1,004,608 describes one processing of a porous ceramic body by which a mixture is ground to a particle size in the range from 400 mesh to 270 mesh before burning. The mixture contains from 25% to 39% (by weight) of a carbonate which is decomposed by burning. The pore size is not indicated, but the size and the proportion of the carbonate particles indicate that the pore size would be about from 10 to 30 μm. The process of this English patent leads to a different material of the one of the present invention.

The U.S. Pat. No. 3,824,112 describes an invention related to permeable ceramic structures and compositions and methods of making the same. Finely divided wollastonite or mullite and finely divided alumina are mixed with fused finely divided fluxing material—anhydrous borax—finely divided silica gel, magnesium oxide and water. The admixture is placed in a mold, after setting, it is dried slowly, then fired at about 870° C. The dehydration of silica gel component creates porosity, afterwards, the fluxing material melts and bonds particles of silica and wollastonite and mullite which neither react nor melt because they are very refractory (col 6 lin 6-25).

Therefore, anorthite is not formed and mineralogical examination will show a very different structure of from the one of this invention material.

The U.S. Pat. No. 3,309,210 describes a process having common points with the process of the present invention, because it involves the gypsum plaster utilization, but it also includes the saw dust utilization. The amounts are from 10 to 25% of saw dust with from 8 to 30% of gypsum plaster. During the burning, the saw dust disappears completely, contrary to the gypsum plaster. In addition of the plaster porosity, another porosity takes place much coarser, probably about a hundred microns, owed to the saw dust consumed, the volume of those coarse pores is important compared with the volume of the gypsum plaster pores. Thus, in this respect, the material is very different of the material of the present invention and it is not utilizable as mold material for the sanitary ceramics molding. Besides, this material is claimed like a thermal insulator. Moreover, the chemical composition of the final product obtained from the U.S. Pat. No. 3,309,210 is very different of the composition claimed in the present invention, it contains from 98 to 99.8% of $Al_2O_3$ plus CaO, the $CaO/Al_2O_3$ ratio being 5/95 (col 2 lin 34–38). The claims give broader limits, from 84 to 96.5% of $Al_2O_3$, from 3.3 to 12.3% of CaO and 0.1 to 2% of $SiO_2$ (ratio $SiO_2/Al_2O_3$ from 0.001 to 0.025). Such a material essentially constituted by alumina must not be machined by tools for wood, in contrast to the material of the present invention, since this material must be resistant to the abrasion (col 3 lin 74 to col 4 lin 2). The process according to this patent requires a calcination at a temperature above 2800° F. (1537° C.) in hydrogen atmosphere. In the present application on the FIG. 3, it is seen that the temperature of 1400° C. and above leads to a porosity collapse; therefore the process of the U.S. Pat. No. 3,309,210 cannot be used for obtaining the product according to the present invention.

One starting material valuable for putting into practise the process of this invention is constituted by a mixture, prepared in advance, of various constituents and packed into a sealed container. According to one of the applications of the invention, this starting material is mixed with water to form a slurry which is poured into a mould matrix. After drying at at least 100° C., for example at a 110° C., and removing from the mold the green body is then fired between about 1000° and below about 1400° C., preferably at about 1300° C., there is obtained the material of high porosity. After using this high porosity material for casting and recovery of the clay "tesson or casting body", the mould obtained from the starting material, because it was and then fired at a temperature between about 1000° and below about 1400° C., can be rapidly dried and/or regenerated by washing, the constitution on this fired material being inert towards water.

The advantages of the invention will more clearly be apparent from the following non-limiting examples, which are illustrated by the figures, of which:

By way of the first example, a barbotine or casting slurry was formed by mixing plaster, fireclay and alumina in the following proportions by weight (point D of FIG. 1).

plaster: 21.31%
fireclay: 32.25%
alumina: 46.44%

The fireclay had the following composition: $SiO_2$: 53.30-$Al_2O_3$: 41.55-$TiO_2$: 2.70-$Fe_2O_3$: 1.80-$K_2O$: 0.42-$Na_2O$: 0.08-lost in heating: 0.18. It was crushed to a specific surface area of 6000 cm$^2$/g SSB. The alumina used in this example is an alumina calcined at high temperature so that its BET surface is between 0 and 1.5 m$^2$/g. Its fineness expressed in terms of Blaine specific surface is also 6000 cm$^2$/g.

The water/dry mixture ratio is 0.3 in the presence of 0.1% of plasticiser.

The barbotine was then moulded, the moulded piece was removed from the mould after two hours, dried at a 110° C., and then calcined at 1300° C. for six hours.

Figure 2:
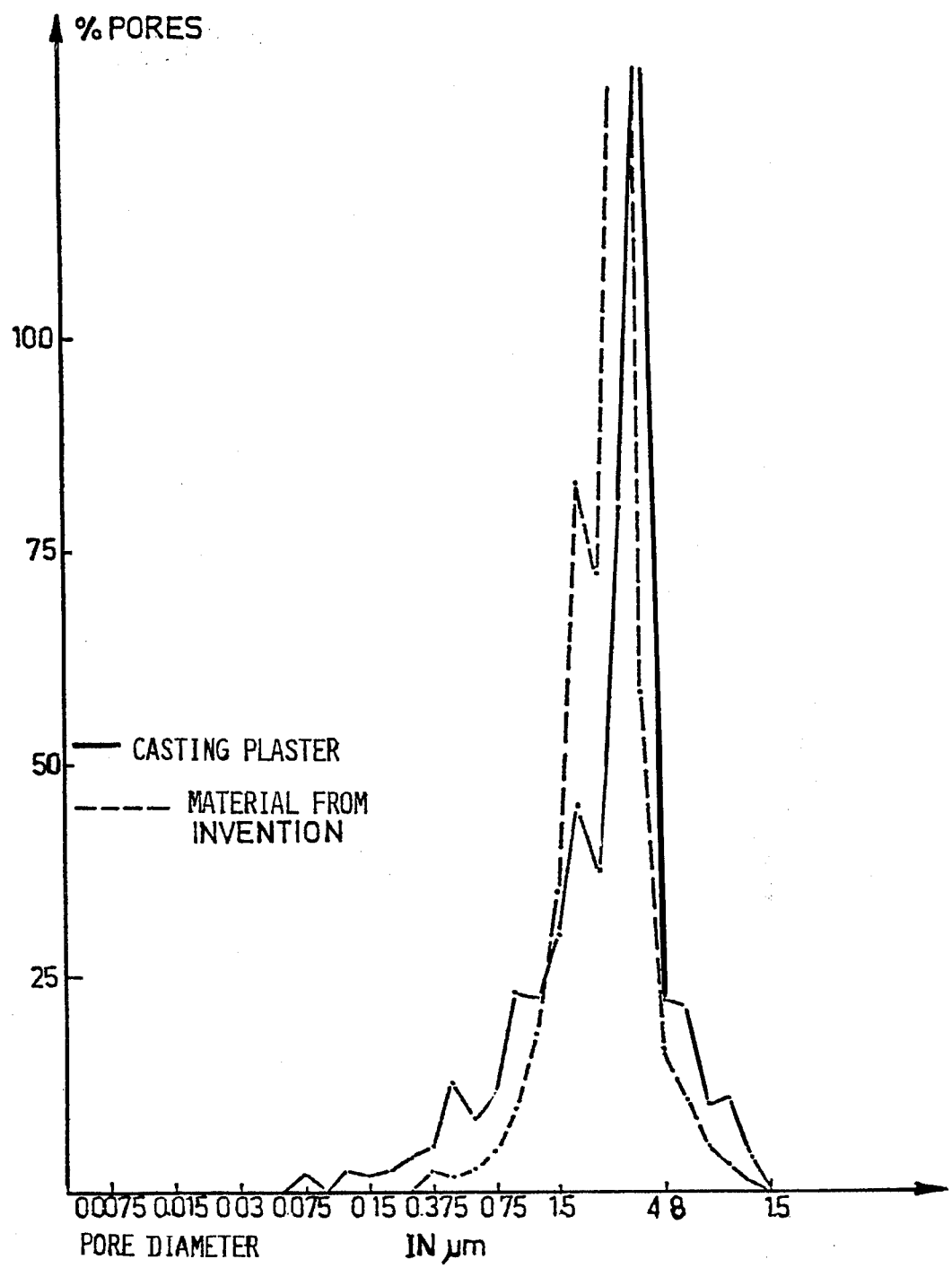
FIG. 2 is a comparative graph of the spectra of the pores of a mould material according to the invention and of a traditionnal gypsum plaster product.

The resulting product had the following properties:
(a) raw state
mechanical strength 2 hours after mixing
modulus of rupture: 2.5 N/m2
compressive strength: 8 N/m2
shrinkage after drying at 110° C. : 0%
(b) fired state
modulus of rupture: 6.5 N/m2
compressive strength: 18.5 N/m2
shrinkage during firing: 1.5%
porosity by absorption of water: 55%
pore size (measured with mercury): diameter of pores between 0.75μ and 5μ; FIG. 2 attached shows the very great similarity between the pore spectrum of the product contained by the invention and that of plaster products.
apparent density: 1.45
solubility: 0
X-ray defraction examination reveals the presence of anorthite (calcium aluminosilicate-(Merck Index 11 ed #1637)), alumina, and a small quantity of CaO, 6 $Al_2O_3$.

The final material obtained is a microporous anorthite with an alumina skeleton.

This mould material:
is inert towards water, thus can be regenerated as a mould by washing
has the surface appearance of plaster
has an absorbing capability identical to that of traditional plaster moulds.

Thus, as with plaster moulds with a conventional barbotine, a satisfactory "tesson" 10 mm in thickness is obtained after 2 hours of percolation. This "tesson" has an excellent surface aspect and does not adhere to the mould of this invention.

The absorbing capacity of the mould has been found to be unchanged after 50 castings. It is besides possible to regenerate it by washing and drying, in contrast to plaster moulds which cannot be washed.

It has been found that any chipping of the mould can be repaired without difficulty with plaster. Finishing of the material is also easy using wood-working tools.

Another advantage of the material is that it can be recovered and used as an aggregate for a insulating concrete, in contrast to moulds of plaster, which must be disposed of by dumping, which can cause problems of pollution. Analogous results have been obtained with a series of product examples according to the invention, of various compositions. The foregoing example has been incorporated in this series under the reference "D".

The overall composition of the dry mixtures, their chemical composition and the composition of the final products are given by the Tables 1, 2 and 3.

TABLE 1

| Points in the diagram | % plaster Molda 3 | % fire clay Sodgar SSB: 6000 cm²/g | % Alumina A SSB: 6000 cm²/g |
|---|---|---|---|
| A | 38.77 | 58.68 | 2.55 |
| B | 35.54 | 53.77 | 10.68 |
| C | 30.31 | 45.86 | 23.83 |
| D | 21.31 | 32.25 | 46.44 |
| E | 13.32 | 20.14 | 66.54 |
| F | 39.48 | 44.60 | 15.92 |
| G | 40.17 | 29.97 | 29.86 |
| H | 40.94 | 14.87 | 44.20 |
| I | 34 | 15 | 51 |

TABLE 2

Chemical Composition Before Firing at 1000–1400° C.

| Points in the diagram | % Al$_2$O$_3$ | % SiO$_2$ | % CaO | % SO$_3$ |
|---|---|---|---|---|
| A | 28.77 | 33.84 | 15.78 | 21.61 |
| B | 34.99 | 30.87 | 14.41 | 19.73 |
| C | 44.66 | 26.27 | 12.26 | 16.80 |
| D | 6.75 | 18.17 | 8.48 | 11.61 |
| E | 76.35 | 11.23 | 5.24 | 7.18 |
| F | 36.41 | 25.70 | 15.99 | 21.90 |
| G | 44.25 | 17.35 | 16.22 | 22.18 |
| H | 52.32 | 8.79 | 16.41 | 22.47 |
| I | 56.71 | 9.03 | 14.39 | 19.87 |

TABLE 3

Chemical Composition After Firing

| Points in the diagram | % Al$_2$O$_3$ | % SiO$_2$ | % CaO |
|---|---|---|---|
| A | 36.70 | 43.17 | 20.14 |
| B | 43.59 | 38.46 | 17.95 |
| C | 53.68 | 31.58 | 14.74 |
| D | 69.86 | 20.56 | 9.59 |
| E | 82.26 | 12.10 | 5.65 |
| F | 46.62 | 32.91 | 20.48 |
| G | 56.88 | 22.30 | 20.82 |
| H | 67.49 | 11.34 | 21.17 |
| I | 70.78 | 11.27 | 17.96 |

The mechanical characterisitics before and after firing are given in Table 4. (unity: N/mm2)

TABLE 4

| Points in the diagram | Before Firing Modulus of rupture | After Maintaining for 2 h. at 20° C. Compressive strength | After Firing at 1300° C. Modulus of rupture | After Firing at 1300° C. Compressive strength |
|---|---|---|---|---|
| A | 3.1 | 7.9 | 5.3 | 17.9 |
| B | 4.1 | 9.0 | 4.1 | 9.9 |
| C | 2.6 | 4.4 | 3.4 | 7.3 |
| D | 2.0 | 4.0 | 4.2 | 10.4 |
| E | 1.0 | 1.8 | 5.2 | 14.0 |
| F | 4.3 | 10.8 | 3.8 | 11.0 |
| G | 3.8 | 9.8 | 4.5 | 10.6 |
| H | 3.9 | 10.7 | 2.9 | 8.5 |
| I | 3.9 | 9.5 | 2.9 | 9.3 |

Figure 1:
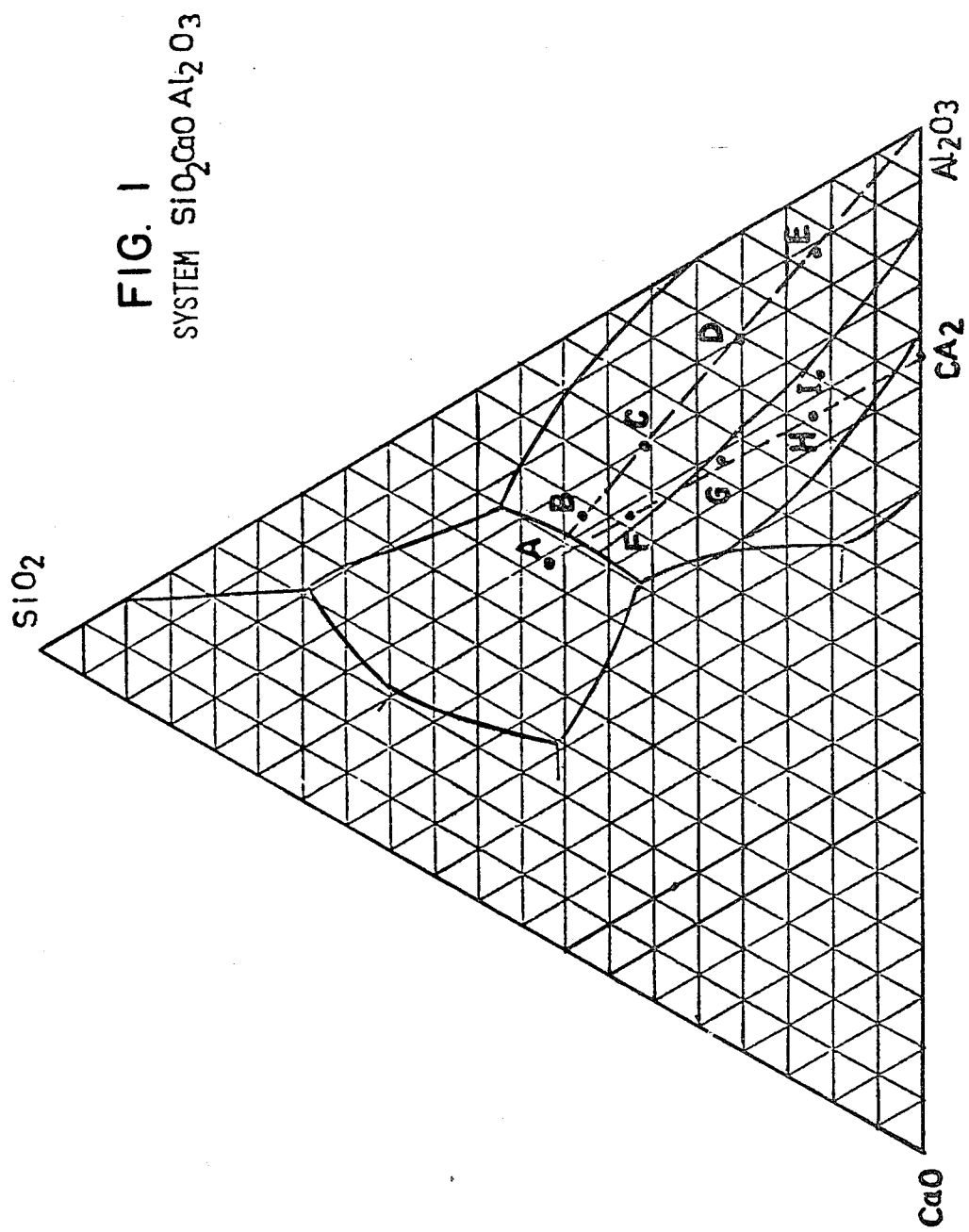
FIG. 1 is a Rankin diagram on which have been inserted points representing the examples.

The final compositions are set out in FIG. 1.

Figure 3:
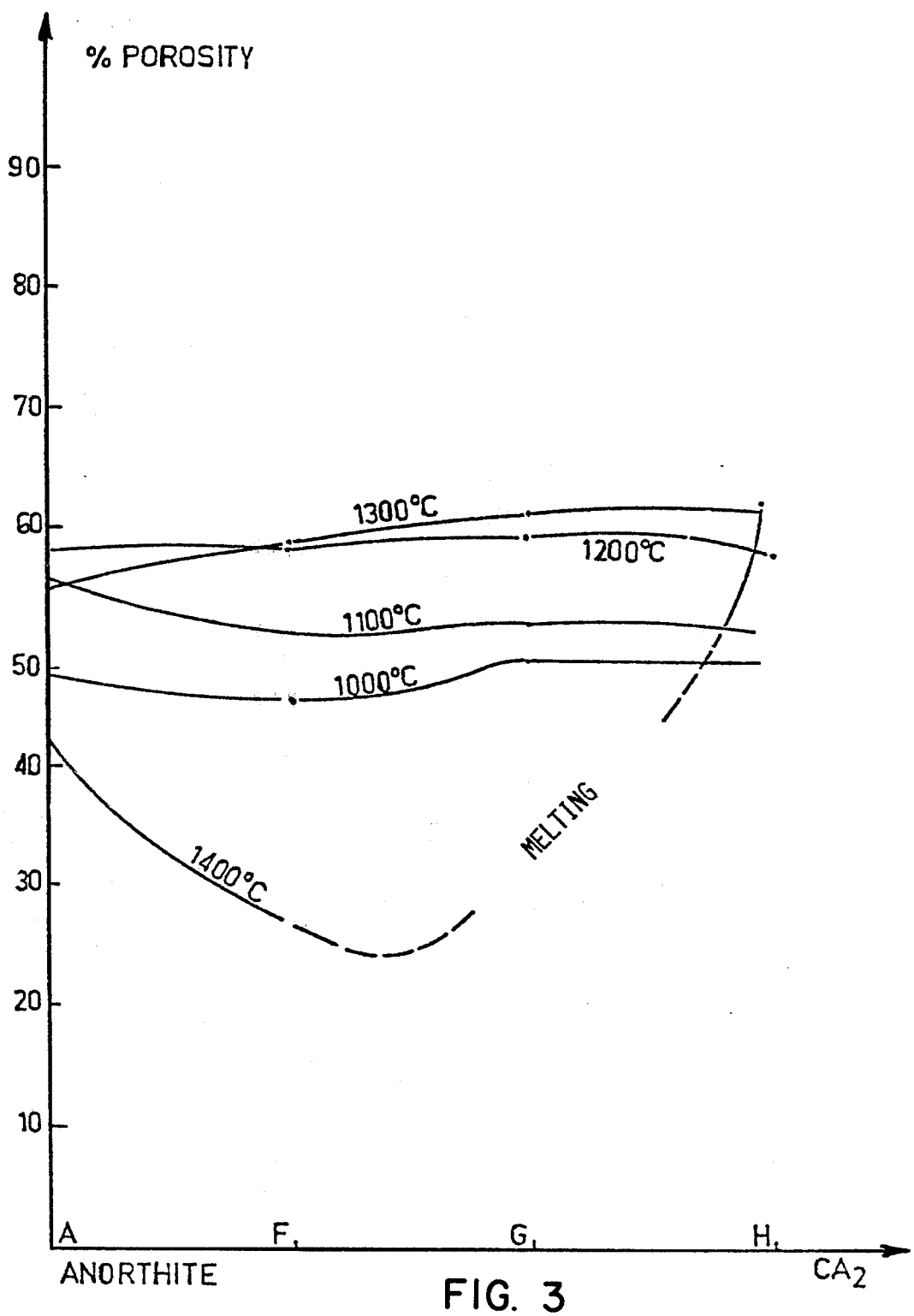
FIGS. 3 and 4 illustrate the variations in the porosity of the final product as a function of the composition and the firing temperature.
Figure 4:
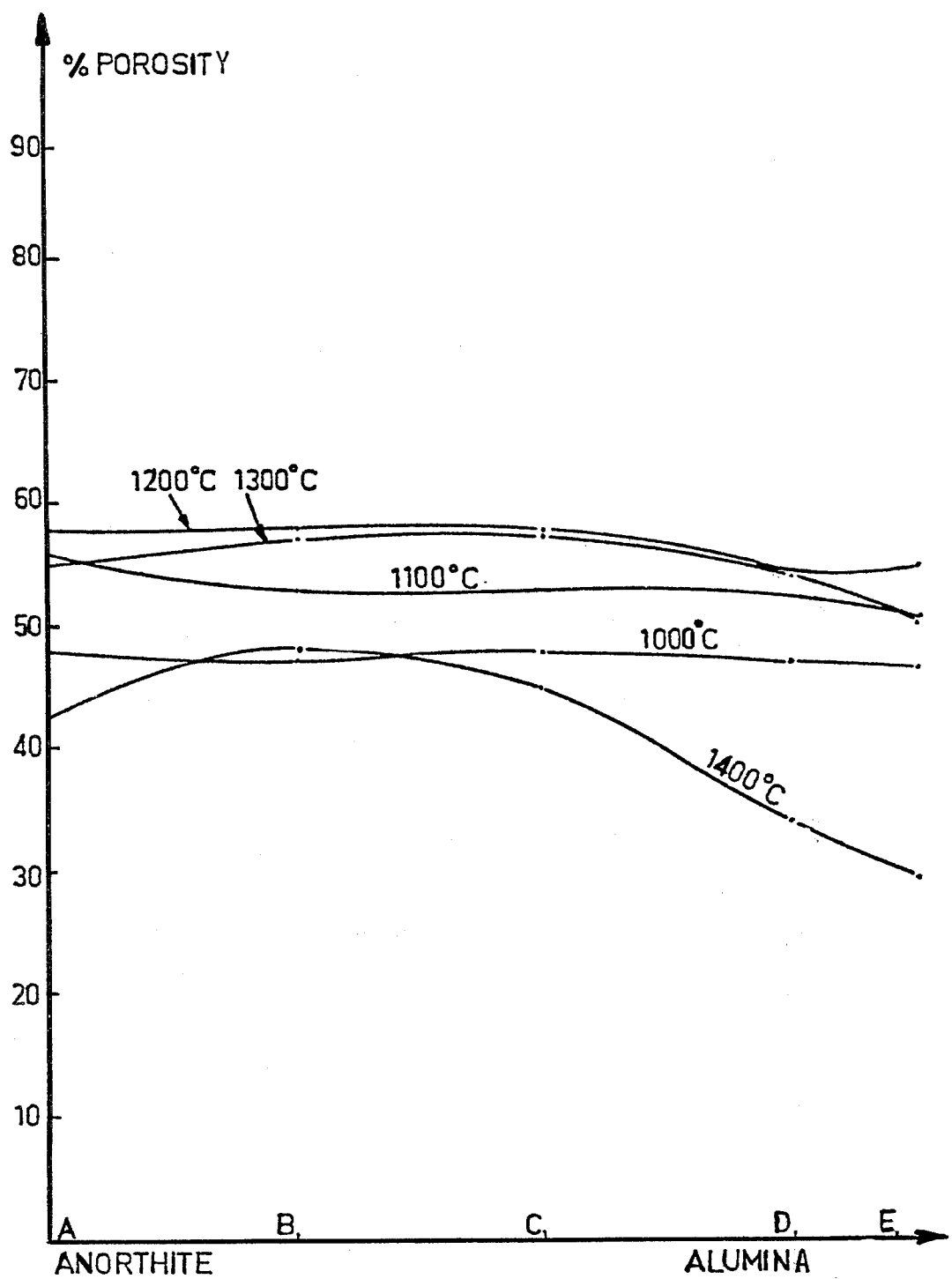

FIGS. 3 and 4, show that the final porosities vary little as a function of the composition and remain satisfactory provided that the firing temperature is above that at which SO$_2$ is evolved, starting at about 1000° C. and anorthite forms and yet remains lower than 1400° C.

Another advantage of the invention should here be indicated, that is to say the possibility of increasing the porosity of a desired quantity selected in advance to provide a given range of pore dimensions by the addition to the starting mixture of a pore-forming product of suitable particle size which disappears during firing: flour, sawdust, etc.

I claim:

1. A casting mould material for the manufacture of sanitary castings comprising a shaped object of microporous material substantially consisting of anorthite on an alumina skeleton, prepared by forming a water slurry of a mixture of an aluminous granulate; a fireclay and a CaSO$_4$, in which mixture the SiO$_2$ to Al$_2$O$_3$ weight-/ratio ranges from about 0.05 to about 2.0 and the CaO to Al$_2$O$_3$ ratio is less than 1 and the CaSO$_4$ (on an anhydrous basis) constitutes at least 10% of said mixture, casting said slurry in a mould into approximate shape, drying said moulded shape, and subsequently firing said moulded shape at a temperature above or about 1000° C. and below or about 1400° C., thereby forming said microporous material of anorthite on alumina with a volume porosity of from about 40% to about 70%, and a pore diameter in the range from about 0.6 to about 8 microns.

2. The casting mould, as claimed in claim 1, wherein said aluminous granulate is at least one member selected from a group consisting of natural or synthetic alumina trihydrate, alumina obtained from moderate or intense calcination of alumina trihydrate by the Bayer process, or low-iron-content white bauxite calcined and ground to a fineness such that approximately 95% by weight has a particle size of less than 100 microns.

3. A casting mould, as claimed in claim 1, wherein said fireclay is a clay which has a composition by weight of SiO$_2$ from about 50% to about 55%, Al$_2$O$_3$ from about 40% to about 45% and various oxides of less than approximately 10%.

4. The process of regenerating a microporous mould according to claim 1 which comprises the steps of washing said mould with water and subsequently drying.

5. A slurry for making moulds essentially consisting of water and a mixture consisting essentially of aluminous granulate, a fireclay a CASO$_4$, the mixtures containing ratios by weight of SiO$_2$ to Al$_2$O$_3$, ranging from about 0.05 to about 2, and CaO to Al$_2$O$_3$ of less than 1 and the CaSO$_4$ measured anhydrous, comprising at least 10% of the dry weight of the mixture, said mixture being capable of being dried and fire hardened to form a microporous material consisting essentially of anorthite on an alumina skeleton.

6. A mixture, as claimed in claim 5, wherein the weight ratio of SiO$_2$ to Al$_2$O$_3$ is between 0.15 and 1.5 and the weight ratio of CaO to Al$_2$O$_3$ is between 0.07 and 0.6.

7. A product comprising a hard microporous material composed of anorthite on an alumina skeleton, said hard microporous material having a porosity from about 40% to about 70%, by volume, and a pore diameter from about 0.6 to about 8 microns, having been mould formed from a hardenable slurry of water and a mixture of aluminous granulate, a fireclay and a CaSO$_4$, the mixture containing ratios by weight of $SiO_2$ to $Al_2O_3$ ranging from about 0.05 to about 2 and CaO to $Al_2O_3$ of less than 1 and the $CaSO_4$ basis comprising at least 10% of the dry weight of the mixture, that has been subsequently dried and fired to form said hard microporous material.

8. A microporous material comprising, in combination:
a hardened material composed of anorthite and alumina, said hardened material having a porosity from about 40% to about 70% by volume and a pore diameter from about 0.6 to about 8 microns.

9. The method of preparing a mould for sanitary articles from the material according to claim 1 which comprises the steps of
(a) preparing a slurry of water with a mixture comprising:
an aluminous granulate selected from the group consisting of natural and synthetic alumina trihydrate, alumina obtained from the moderate or intense calcination of the alumina trihydrate by the Bayer process, and calcined low-iron-content bauxite; ground to a particle size of about 100 microns or smaller;
a fireclay having the composition by weight of about 50 to 55% $SiO_2$, 40 to 45% $Al_2O_3$ and less than about 10% of the other oxides and;
said $CaSO_4$ is selected from the group consisting of plasters and hydrated and anhydrous calcium sulfate;
(b) pouring said slurry into a mould; setting the contents of said mould to form objects in molded shapes;
(c) drying said shaped objects and
(d) firing said shaped objects at temperatures of about 1300° C. at which said mixture is converted to anorthite on an alumina skeleton and having a volume-porosity in the range 40 to 70% and a pore diameter of from about 0.6 to 8.0 microns.

10. The method of casting sanitary objects which comprises introducing a suitable clay slurry into the mould according to claim 1 and forming green "sanitary objects" therefrom suitable for subsequent firing and glazing.

* * * * *